United States Patent
Xu et al.

(10) Patent No.: US 11,023,446 B2
(45) Date of Patent: Jun. 1, 2021

(54) METHOD AND DEVICE FOR PROCESSING DISTRIBUTED TRANSACTION

(71) Applicant: TRANSWARP TECHNOLOGY (SHANGHAI) CO., LTD., Shanghai (CN)

(72) Inventors: Fei Xu, Shanghai (CN); Wanggen Liu, Shanghai (CN); Ke Dai, Shanghai (CN); Yi Kang, Shanghai (CN)

(73) Assignee: TRANSWARP TECHNOLOGY (SHANGHAI) CO., LTD., Shanghai (CN)

(*) Notice: Subject to any disclaimer, the term of this patent is extended or adjusted under 35 U.S.C. 154(b) by 1007 days.

(21) Appl. No.: 15/495,399

(22) Filed: Apr. 24, 2017

(65) Prior Publication Data

US 2017/0308566 A1 Oct. 26, 2017

(30) Foreign Application Priority Data

Apr. 22, 2016 (CN) .......................... 201610254762.3

(51) Int. Cl.
*G06F 16/00* (2019.01)
*G06F 16/23* (2019.01)
(Continued)

(52) U.S. Cl.
CPC .......... *G06F 16/2343* (2019.01); *G06F 9/466* (2013.01); *G06F 11/1438* (2013.01);
(Continued)

(58) Field of Classification Search
CPC .............. G06F 11/1438; G06F 11/203; G06F 16/2343; G06F 16/2379; G06F 16/24553;
(Continued)

(56) References Cited

U.S. PATENT DOCUMENTS

| | | | | |
|---|---|---|---|---|
| 2002/0038313 A1* | 3/2002 | Klein | ................ | G06F 16/24568 |
| 2015/0019517 A1* | 1/2015 | Wang | ................. | G06F 16/2246 |
| | | | | 707/704 |
| 2016/0283540 A1* | 9/2016 | Barber | ............... | G06F 16/2336 |

FOREIGN PATENT DOCUMENTS

| | | |
|---|---|---|
| CN | 102375955 A | 3/2012 |
| CN | 103942269 A | 7/2014 |

(Continued)

OTHER PUBLICATIONS

International Search Report (English and Chinese) and Written Opinion issued in PCT/CN2017/080846 dated Jul. 7, 2017, 15 pages.

*Primary Examiner* — Dinku W Gebresenbet
(74) *Attorney, Agent, or Firm* — Hamre, Schumann, Mueller & Larson, P.C.

(57) ABSTRACT

An objective of the present application is to provide a method and device for processing a distributed transaction. Compared with the prior art, in a distributed system, a first device in the present application is a group formed by multiple nodes. The first device acquires a writer lock adding request, sent by an SQL compiler, about a target table of a to-be-processed transaction, and performs writer lock adding processing on the target table on the basis of the writer lock adding request, so as to avoid collision problems in multi-transaction concurrence and to ensure isolation of transactions. If the writer lock adding processing is successful, to-be-processed version information of the target table is sent to the SQL compiler, so as to ensure that the SQL compiler operates a correct version of the target table later. Further, by restarting child nodes which do not respond to the writer lock adding request or migrating service of the child nodes to other physical machines and then updating locking state information of the child nodes, the present (Continued)

application effectively recovers errors and ensures in-group consistency.

20 Claims, 5 Drawing Sheets

(51) Int. Cl.
*G06F 16/2455* (2019.01)
*G06F 9/46* (2006.01)
*G06F 11/14* (2006.01)
*G06F 11/20* (2006.01)

(52) U.S. Cl.
CPC ........ *G06F 11/203* (2013.01); *G06F 16/2379* (2019.01); *G06F 16/24553* (2019.01); *G06F 2201/80* (2013.01); *G06F 2201/805* (2013.01); *G06F 2201/82* (2013.01); *G06F 2201/825* (2013.01)

(58) Field of Classification Search
CPC ........... G06F 2201/80; G06F 2201/805; G06F 2201/82; G06F 2201/825; G06F 9/466
See application file for complete search history.

(56) References Cited

FOREIGN PATENT DOCUMENTS

| | | |
|---|---|---|
| CN | 104572568 A | 4/2015 |
| CN | 105162878 A | 12/2015 |
| CN | 105955804 A | 9/2016 |

\* cited by examiner

METHOD AND DEVICE FOR PROCESSING DISTRIBUTED TRANSACTION

TECHNICAL FIELD

The present application relates to the field of computers, and more particularly to a technology for processing a distributed transaction.

BACKGROUND

A transaction in a database is a logic working unit during running of the database, serving as a series of operations executed by a single logic working unit, where either the operations are completely executed, or the operations are completely not executed. Transaction processing may ensure that data-oriented resources cannot be updated permanently unless all operations in a transactional unit are successfully completed. If a logic working unit is intended to become a transaction, so-called ACID (Atomicity, Consistency, Isolation and Durability) attributes must be satisfied; in multi-transaction concurrence, how to avoid collision problems is an important problem about system stability and user experience.

SUMMARY

An objective of the present application is to provide a method and device for processing a distributed transaction.

According to an aspect of the present application, a method for processing a distributed transaction at a first device is provided. The method includes:

a, acquiring a writer lock adding request, sent by an SQL compiler, about a target table of a to-be-processed transaction, the transaction including a plurality of SQL sentences;

b, performing writer lock adding processing on the target table on the basis of the writer lock adding request; and c, sending to-be-processed version information of the target table to the SQL compiler if the writer lock adding processing is successful.

Further, the first device includes a father node and a plurality of child nodes, where the step b includes: distributing the writer lock adding request to the plurality of child nodes through the father node, and performing writer lock adding processing on the target table.

Further, the method also includes: if the father node acquires responses of more than or equal to a predetermined number of the child nodes about the writer lock adding request within a predetermined time, determining that the writer lock adding processing is successful.

Further, determining that the writer lock adding processing is successful also includes: writing new locking state information into a log file; or storing new locking state information by the father node.

Further, the method also includes: restarting the child nodes which do not respond to the writer lock adding request, and reading newest locking state information from the log file through the child nodes; or restarting the child nodes which do not respond to the writer lock adding request, and sending newest locking state information to the child nodes through the father node.

Further, restarting the child nodes which do not respond to the writer lock adding request further includes: if the child nodes which do not respond to the writer lock adding request cannot be restarted, migrating service of the child nodes to other physical machines through the father node, and starting the service of the child nodes on the physical machines.

Further, the step b includes: performing writer lock adding processing on a part of the target table, the method also including: sending to a second device a request about adding a writer lock to the part of the target table.

Further, performing writer lock adding processing on a part of the target table includes: if the whole target table has been subjected to writer lock adding, omitting performing writer lock adding processing on the part of the target table; otherwise, performing writer lock adding processing on the part of the target table.

Further, the method also includes: when the quantity of versions of the target table is equal to or greater than a predetermined version quantity threshold, combining a plurality of versions of the target table.

Further, the method also includes: when a commit sentence is acquired, setting the state of a new-version target table to be valid, and unlocking the target table; or when a rollback sentence is acquired, setting the state of the new-version target table to be invalid, and unlocking the target table.

Further, the step a also includes: acquiring a reader lock adding request, sent by the SQL compiler, about a source table of the to-be-processed transaction; the step b further includes: performing reader lock adding processing on the source table on the basis of the reader lock adding request; the step c also includes: if the reader lock adding processing is successful, sending to-be-processed version information of the source table to the SQL compiler; and the method also includes: when the commit sentence or the rollback sentence is acquired, unlocking the source table. According to another aspect of the present application, a method for processing a distributed transaction at a second device is also provided. The method includes:

A, acquiring a request, sent by a first device, about adding a writer lock to a part of a target table; and B, performing writer lock adding processing on the part of the target table according to the request about adding the writer lock to the part of the target table.

Further, the step B includes: querying to the first device to judge whether the whole target table has been subjected to write lock adding according to the request about adding the writer lock to the part of the target table; and if the whole target table has not been subjected to writer lock adding, performing writer lock adding processing on the part of the target table.

Further, the second device includes a father node and a plurality of child nodes, where the step B includes: distributing the request about adding the writer lock to the part of the target table to the plurality of child nodes through the father node, and performing writer lock adding processing on the part of the target table.

According to a further aspect of the present application, a first device for processing a distributed transaction is also provided. The device includes:

a first apparatus, used for acquiring a writer lock adding request, sent by an SQL compiler, about a target table of a to-be-processed transaction, the transaction including a plurality of SQL sentences;

a second apparatus, used for performing writer lock adding processing on the target table on the basis of the writer lock adding request; and a third apparatus, used for sending to-be-processed version information of the target table to the SQL compiler if the writer lock adding processing is successful.

Further, the device includes a father node and a plurality of child nodes, where the second apparatus is used for distributing the writer lock adding request to the plurality of child nodes through the father node, and performing writer lock adding processing on the target table.

Further, the device further includes: a fourth apparatus, used for determining that the writer lock adding processing is successful if the father node acquires responses of more than or equal to a predetermined number of the child nodes about the writer lock adding request within a predetermined time.

Further, determining that the writer lock adding processing is successful also includes: writing new locking state information into a log file; or storing new locking state information by the father node.

Further, the device further includes: a fifth apparatus, used for restarting the child nodes which do not respond to the writer lock adding request, and reading newest locking state information from the log file through the child nodes; or a sixth apparatus, used for restarting the child nodes which do not respond to the writer lock adding request, and sending the newest locking state information to the child nodes through the father node.

Further, restarting the child nodes which do not respond to the writer lock adding request further includes: if the child nodes which do not respond to the writer lock adding request cannot be restarted, migrating service of the child nodes to other physical machines through the father node, and starting the service of the child nodes on the physical machines.

Further, the second apparatus is used for performing writer lock adding processing on a part of the target table, the device also including: a seventh apparatus, used for sending to a second device a request about adding a writer lock to the part of the target table.

Further, performing writer lock adding processing on a part of the target table includes: if the whole target table has been subjected to writer lock adding, omitting performing writer lock adding processing on the part of the target table; otherwise, performing writer lock adding processing on the part of the target table.

Further, the device also includes: an eighth apparatus, used for combining a plurality of versions of the target table when the quantity of versions of the target table is equal to or greater than a predetermined version quantity threshold.

Further, the device also includes: a ninth apparatus, used for setting the state of a new-version target table to be valid, and unlocking the target table when a commit sentence is acquired; or a tenth apparatus, used for setting the state of the new-version target table to be invalid, and unlocking the target table when a rollback sentence is acquired.

Further, the first apparatus is also used for: acquiring a reader lock adding request, sent by the SQL compiler, about a source table of the to-be-processed transaction; the second apparatus is also used for performing reader lock adding processing on the source table on the basis of the reader lock adding request; the third apparatus is also used for sending to-be-processed version information of the source table to the SQL compiler if the reader lock adding processing is successful; and the device further includes: an eleventh apparatus, used for unlocking the source table when the transaction commit sentence or the transaction rollback sentence is acquired.

According to a further aspect of the present application, a second device for processing a distributed transaction is also provided. The device includes:

a twelfth apparatus, used for acquiring a request, sent by a first device, about adding a writer lock to a part of a target table; and a thirteenth apparatus, used for performing writer lock adding processing on the part of the target table according to the request about adding the writer lock to the part of the target table.

Further, the thirteenth apparatus is used for: querying to the first device to judge whether the whole target table has been subjected to write lock adding according to the request about adding the writer lock to the part of the target table; and if the whole target table has not been subjected to write lock adding, performing writer lock adding processing on the part of the target table.

Further, the device includes a father node and a plurality of child nodes, where the thirteenth apparatus is used for: distributing the request about adding the writer lock to the part of the target table to the plurality of child nodes through the father node, and performing writer lock adding processing on the part of the target table.

According to a yet further aspect of the present application, a system for processing a distributed transaction is also provided. The system includes the above-mentioned first device and the above-mentioned second device.

Compared with the prior art, in a distributed system, a first device in the present application is a group formed by multiple nodes. The first device acquires a writer lock adding request, sent by an SQL compiler, about a target table of a to-be-processed transaction, and performs writer lock adding processing on the target table on the basis of the writer lock adding request, so as to avoid collision problems in multi-transaction concurrence and to ensure isolation of transactions. If the writer lock adding processing is successful, to-be-processed version information of the target table is sent to the SQL compiler, so as to ensure that the SQL compiler operates a correct version of the target table later. Further, by restarting child nodes which do not respond to the writer lock adding request or migrating service of the child nodes to other physical machines and then updating locking state information of the child nodes, the present application effectively recovers errors and ensures in-group consistency. Further, under the scenario of small quantity and higher concurrence, by performing writer lock adding processing on the target table of the transaction through a system formed by the first device and the second device, and performing writer lock adding processing on a part of the target table through the second device, the present application improves the efficiency of the system.

BRIEF DESCRIPTION OF THE DRAWINGS

By reading detailed descriptions made for unrestricted embodiments with reference to the following drawings, other features, purposes and advantages of the present application will become more obvious.

Identical or similar drawing marks in the accompanying drawings are representative of identical or similar components.

DETAILED DESCRIPTION

The present application will be further described in detail below with reference to the drawings.

In a typical configuration of the present application, a terminal, a device serving a network and a trustee each include one or more central processing units (CPU), an input/output interface, a network interface and a memory.

The memory may include a volatile memory, a random access memory (RAM) and/or a non-volatile memory or other forms in computer-readable media, such as a read-only memory (ROM) or a flash RAM. The memory is an example of the computer-readable medium.

The computer-readable memory includes a volatile medium, a non-volatile medium, a mobile medium and a non-mobile medium, and may implement information storage through any method or technology. Information may be a computer-readable instruction, a data structure, a program module or other data. An example of a computer storage medium includes, but is not limited to, a phase change RAM (PRAM), a static random access memory (SRAM), a dynamic random access memory (DRAM), random access memories (RAMs) of other types, a read-only memory (ROM), an electrically erasable programmable read-only memory (EEPROM), a flash memory or other memory technologies, a compact disc read-only memory (CD-ROM), a digital video disk (DVD) or other optical memories, a magnetic tape cassette, a cassette disk memory or other magnetic storage devices or any other non-transmission media, which may be used for storing information capable of being accessed by a computing device. In accordance with definitions herein, the computer-readable medium does not include non-transitory media such as modulated data signals and carriers.

Figure 2:
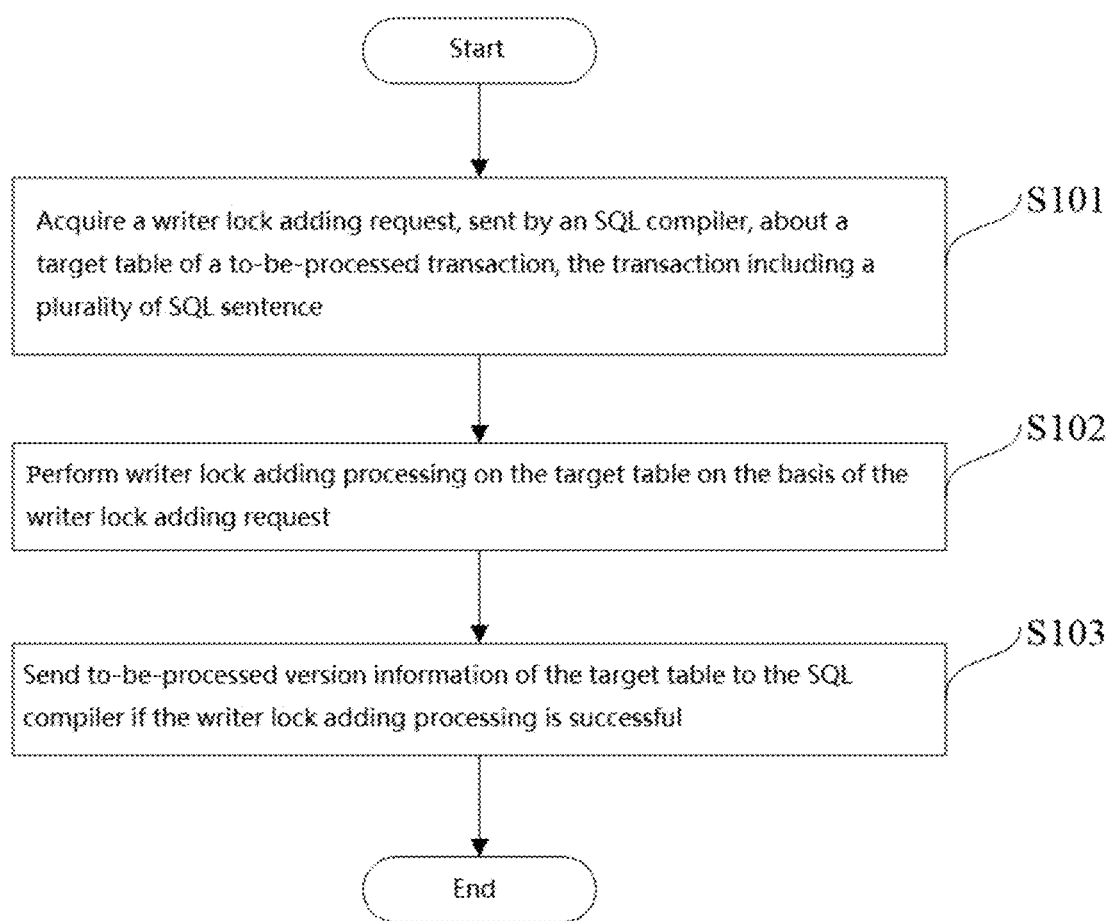
FIG. 2 shows a flowchart of a method for processing a distributed transaction according to an aspect of the present application.

FIG. 2 shows a flowchart of a method for processing a distributed transaction according to an aspect of the present application.

The method includes step S101, step S102 and step S103. Specifically, in step S101, a first device 1 acquires a writer lock adding request, sent by an SQL compiler, about a target table of a to-be-processed transaction, the transaction including a plurality of SQL sentences; in step S102, the first device 1 performs writer lock adding processing on the target table on the basis of the writer lock adding request; and in step S103, the first device 1 sends to-be-processed version information of the target table to the SQL compiler if the writer lock adding processing is successful.

Here, the first device 1 includes, but is not limited to, user equipment, a network device, or a device formed by integrating the user equipment and the network device through a network. The user equipment includes, but is not limited to, any one mobile electronic product capable of performing human-computer interaction with a user through a touch panel, such as a smart phone, a pad and the like, where the mobile electronic product may adopt any operating system, such as an android operating system, an iOS operating system and the like. Here, the network device includes an electronic device capable of automatically performing numerical calculation and information processing according to a preset or stored instruction, and hardware of the network device includes, but is not limited to, a microprocessor, an application specific integrated circuit (ASIC), a field programmable gate array (FPGA), a digital signal processor (DSP), an embedded device, etc. The network device includes, but is not limited to, a cloud formed by a computer, a network host, a single network server, multiple network server sets or multiple servers; here, the cloud is formed by a great number of cloud computing-based computers or network servers, where cloud computing is one of distributed computing, and is executed by a virtual super computer formed by a group of loosely-coupled computer sets. The network includes, but is not limited to, an Internet, a wide area network, a metropolitan area network, a local area network, a VPN, an Ad Hoc network, etc. Preferably, the first device 1 may also be a script program running on the user equipment, the network device, or a device formed by integrating the user equipment and the network device, or by integrating the network device, or by integrating a touch terminal, or by integrating the network device and the touch terminal through a network. Certainly, a person skilled in the art shall understand that the above first device 1 is only exemplary, other existing or future possible first devices 1, which may be applied, for example, to the present application, shall be included within the scope of protection of the present application, and are included herein by reference.

In step S101, the first device 1 acquires a writer lock adding request, sent by an SQL compiler, about a target table of a to-be-processed transaction, the transaction including a plurality of SQL sentences.

Here, components of an SQL (structured query language) include a DCL (database control language). The transaction begins from a DCL sentence begin transaction, and ends by a DCL sentence commit or rollback. A plurality of CRUD (an acronym of vocabularies namely Create, Retrieve, Update and Delete, mainly used for describing basic operating functions of a database or a persistent layer in a software system) SQL sentences are included between the DCL sentences at start and end points of the transaction. The target table refers to a table on which the SQL sentences will execute a write operation. Moreover, in a locking process, a writer lock adding request corresponding to each SQL sentence in the transaction is carried out independently.

For example, the acquired SQL sentence is compiled by the SQL compiler first to obtain a table and an execution plan involved in the SQL sentence, and then the SQL compiler sends a writer lock adding request about a target table of the SQL sentence in the transaction to the first device 1, thereby avoiding collision problems in multi-transaction concurrence through a locking manner and ensuring isolation of transactions.

Preferably, in step S101, the first device 1 also acquires a reader lock adding request, sent by the SQL compiler, about a source table of the to-be-processed transaction.

Here, the source table refers to a table on which the SQL sentence will execute a read operation. In most of application scenarios, the SQL sentence has both a target table and a source table, and the SQL compiler also needs to send a reader lock adding request for the source table of the SQL sentence. In some of application scenarios, the SQL sentence only has a target table and has no a source table, and the SQL compiler does not need to send a reader lock adding request for the source table of the SQL sentence.

In step S102, the first device 1 performs writer lock adding processing on the target table on the basis of the writer lock adding request.

Here, writer lock adding processing is performed on the target table of the SQL sentence of the transaction. Other transactions cannot execute the write operation on the target table which has been subjected to writer lock adding before the writer lock is released.

Preferably, in step S102, the first device 1 also performs reader lock adding processing on the source table on the basis of the reader lock adding request.

For example, if the SQL sentence has both the target table and the source table, it is also necessary to perform reader lock adding processing on the source table on the basis of the reader lock adding request.

Preferably, the first device 1 includes a father node and a plurality of child nodes, where in step S102, the first device 1 distributes the writer lock adding request to the plurality of child nodes through the father node, and performs writer lock adding processing on the target table.

Figure 1:
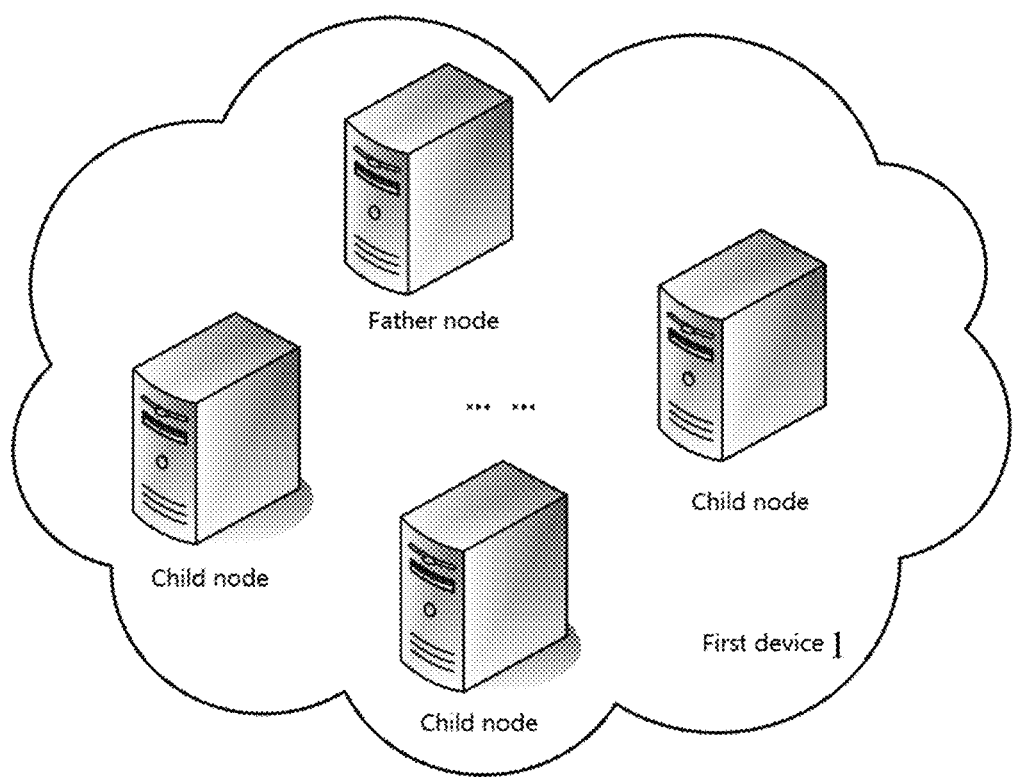
FIG. 1 shows a structural diagram of a first device according to an embodiment of the present application.

For example, a physical machine (such as a server and the like) is a node. Referring to FIG. 1, the first device 1 may be a group formed by programs running on multiple physical machines; and in the group, one of the physical machines is selected as a father node, and the other physical machines are child nodes. When the writer lock adding request sent by the SQL compiler is acquired, the father node is responsible for broadcasting the writer lock adding request to all the child nodes in the group, so as to perform writer lock adding processing on the target table. In a preferable embodiment, under the scenario of large data volume and not high concurrency, the writer lock adding request is processed in batches.

In step S103, the first device 1 sends to-be-processed version information of the target table to the SQL compiler if the writer lock adding processing is successful.

For example, a result of each CRUD operation is a new version of a target table of the present CRUD operation. Usually one table will have multiple versions after being subjected to the CRUD operation. Here, after the writer lock adding processing is successful, the to-be-processed version information of the target table is returned to the SQL compiler, so as to ensure that the SQL compiler operates a correct version of the target table later.

Preferably, In step S103, if the reader lock adding processing is successful, the first device 1 sends to-be-processed version information of the source table to the SQL compiler.

For example, if the SQL sentence has both the target table and the source table, it is also necessary to return the to-be-processed version information of the source table to the SQL compiler, so as to ensure that the SQL compiler operates a correct version of the target table later.

Preferably, the method further includes: when the quantity of versions of the target table is equal to or greater than a predetermined version quantity threshold, the first device 1 combines a plurality of versions of the target table.

For example, after the target table is subjected to a plurality of CRUD operations, a plurality of versions will be generated accordingly. As time passes, the quantity of versions of the target table is continuously increasing. In a preferable embodiment, when the quantity of versions of the target table is equal to or greater than a predetermined version quantity threshold, the plurality of versions of the target table are combined to obtain a new version, and previous versions are cleared.

Preferably, the method further includes: when acquiring a commit sentence, the first device 1 sets the state of a new-version target table to be valid, and unlocks the target table; and when acquiring a rollback sentence, the first device sets the state of the new-version target table to be invalid, and unlocks the target table.

For example, when a DCL sentence commit is acquired, all write operations of the transaction on the target table are marked to be valid, and meanwhile, all locks occupied by the transaction are released, namely the target table is unlocked; and when a DCL sentence rollback is acquired, all write operations of the transaction on the target table are marked to be invalid, and meanwhile, all locks occupied by the transaction are released, namely the target table is unlocked. Thus, the atomicity and consistency of the transaction are ensured.

Preferably, the method further includes: when acquiring the commit sentence or the rollback sentence, the first device 1 unlocks the source table.

For example, when the commit sentence or the rollback sentence is acquired, all the locks occupied by the transaction will be released. Both a writer lock for the target table and a reader lock for the source table are released.

Figure 3:
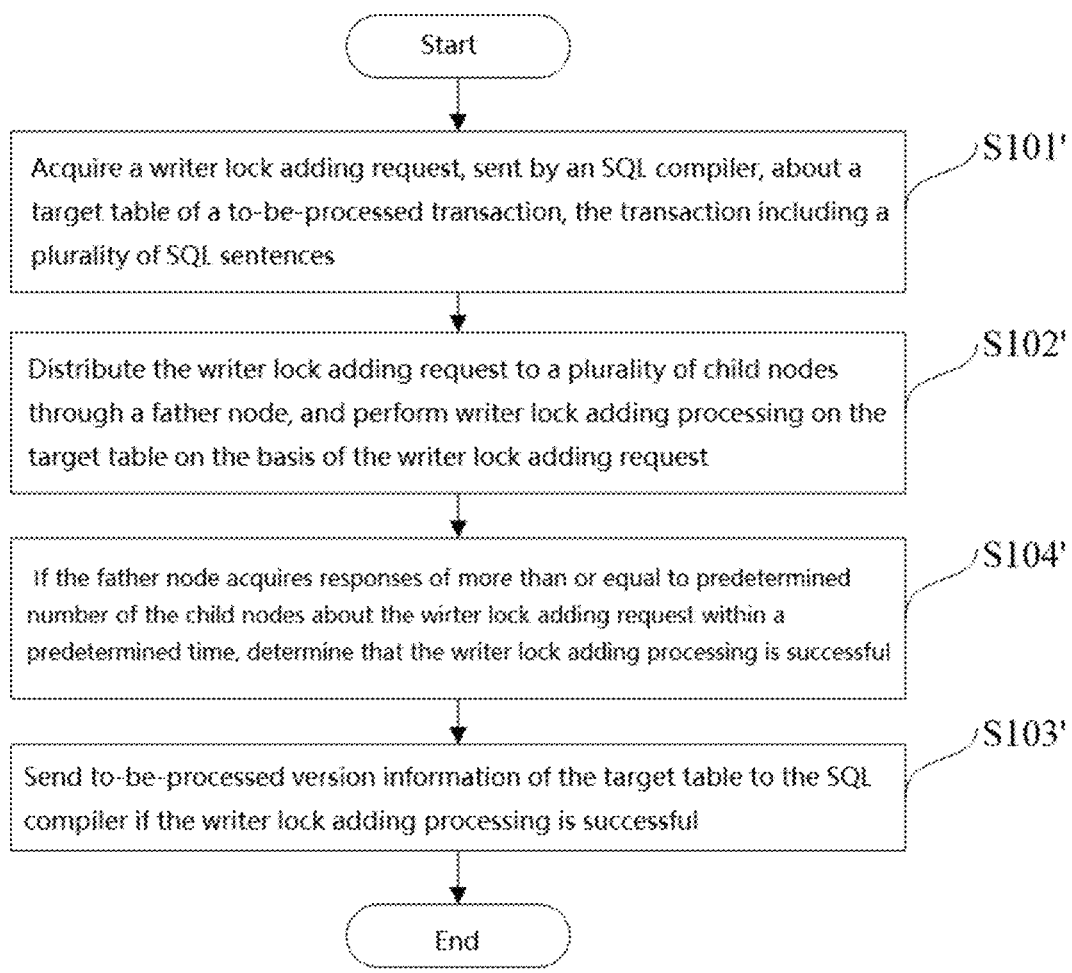
FIG. 3 shows a flowchart of a method for processing a distributed transaction according to an embodiment of the present application.

FIG. 3 shows a flowchart of a method for processing a distributed transaction according to an embodiment of the present application.

The method includes step S101', step S102', step S104' and step S103'. Here, the contents of step S101' and step S103' are the same as or basically the same as those of step S101 and step S103 in FIG. 1. For brief descriptions, the contents will not be elaborated.

Specifically, in step S102', the first device 1 distributes the writer lock adding request to a plurality of child nodes through the father node, and performs writer lock adding processing on the target table on the basis of the writer lock adding request; and in step S104', if the father node acquires responses of more than or equal to a predetermined number of the child nodes about the writer lock adding request within a predetermined time, the first device 1 determines that the writer lock adding processing is successful.

For example, the father node is responsible for broadcasting the writer lock adding request to all the child nodes in a group and waiting for responses of the child nodes to the writer lock adding request. Only when responses of more than or equal to a predetermined number of the child nodes about the writer lock adding request are received, it is determined that the writer lock adding processing is successful. If the father node does not receive enough responses of the child nodes about the writer lock adding request within the predetermined time, locking is unsuccessful; at this moment, the father node may have two choices: 1, randomly waiting for a period of time and then continuously sending the writer lock adding request, till a threshold of locking attempt times is reached, and if locking is still unsuccessful at this moment, returning locking failure information; and 2, directly returning the locking failure information. After receiving the locking failure information, an SQL compiler needs to perform retry, namely to resend the writer lock adding request.

Preferably, determining that the writer lock adding processing is successful further includes: writing new locking state information into a log file; or storing the new locking state information by the father node.

For example, if the responses of more than or equal to a predetermined number of the child nodes about the writer lock adding request are obtained, it is determined that the writer lock adding processing is successful, and the new locking state information is stored. Here, there are two modes for storing the new locking state information: 1, writing the new locking state information into the log file; and 2, storing the new locking state information by the father node.

Preferably, the method further includes: the first device 1 restarts the child nodes which do not respond to the writer lock adding request, and the child nodes read newest locking state information from the log file; or the first device restarts the child nodes which do not respond to the writer lock adding request, and the father node sends the newest locking state information to the child nodes.

For example, according to the previous example, if the child nodes do not respond to the writer lock adding request (which may result from dead halt of a physical machine, etc.), it is necessary to restart the child nodes which do not respond to the writer lock adding request, and the child nodes need to update own state information after being restarted, in order to keep consistent with other members (including the father node and the child nodes) in the group. Here, the child nodes also have two modes for updating state information: 1, the child nodes read the newest locking state information from the log file; and 2, the father node sends the newest locking state information to the child nodes. In another embodiment, if the father node cannot respond, a new father node is reselected from the other child nodes in the group.

More preferably, restarting the child nodes which do not respond to the writer lock adding request further includes: if the child nodes which do not respond to the writer lock adding request cannot be restarted, migrating service of the child nodes to other physical machines through the father node, and starting the service of the child nodes on the physical machines.

For example, according to the previous example, the situation where the child nodes which do not respond to the writer lock adding request cannot be restarted may exist. At this moment, service of the child nodes may be migrated to other physical machines through the father node, and the service of the child nodes is started on the physical machines. Thereafter, all the child nodes on the physical machines may update own state information through the above two modes, in order to keep consistent with other members (including the father node and the child nodes) in the group. Compared with the prior art, by restarting child nodes which do not respond to the writer lock adding request or migrating service of the child nodes to other physical machines and then updating locking state information of the child nodes, the present invention effectively recovers errors and ensures in-group consistency.

Figure 4:
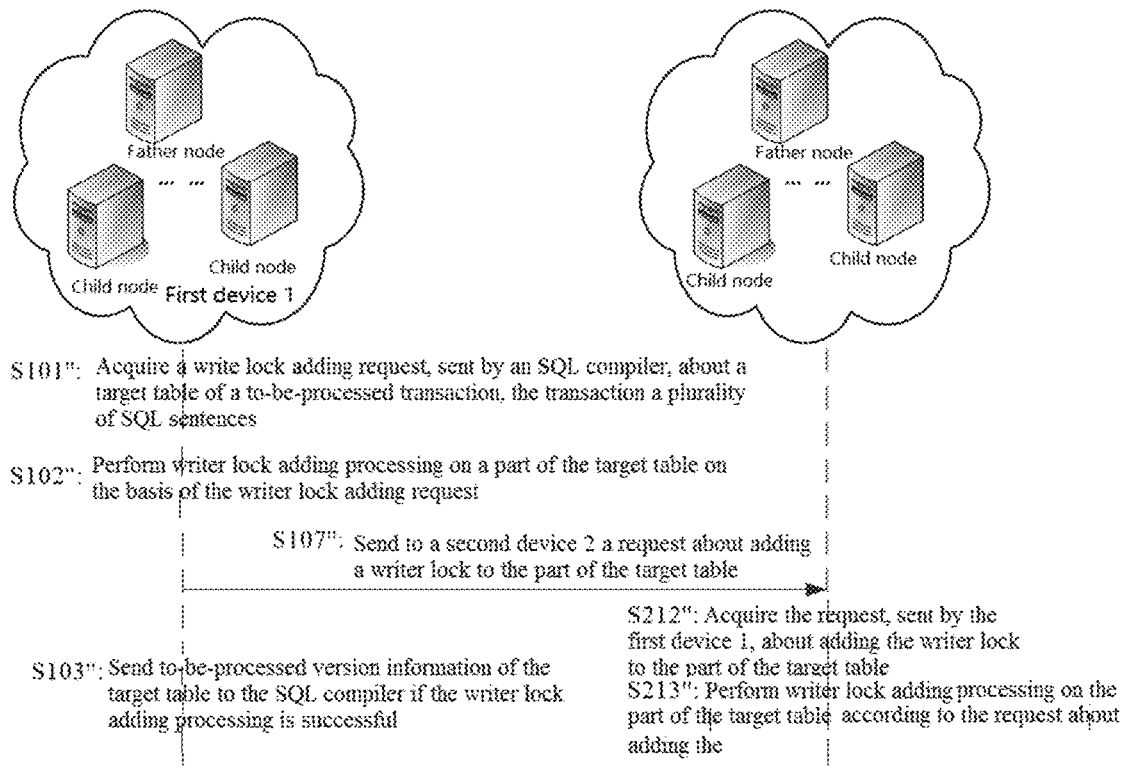
FIG. 4 shows a flowchart of a method for processing a distributed transaction according to another embodiment of the present application.

FIG. 4 shows a flowchart of a method for processing a distributed transaction according to another embodiment of the present application.

The method includes step S101", step S102", step S107", step S103", step S212" and step S213". Here, the contents of step S101" and step S103" are the same as or basically the same as those of step S101 and step S103 in FIG. 1. For brief descriptions, the contents will not be elaborated.

Specifically, in step S102", the first device 1 performs writer lock adding processing on a part of the target table on the basis of the writer lock adding request; and in step S107", the first device 1 sends to a second device 2 a request about adding a writer lock to the part of the target table.

For example, under the scenario of small quantity and higher concurrency, the SQL compiler may further refine the granularity of a lock, and send a writer lock adding request to the first device 1 for a certain part in the target table. Here, the first device 1 responds to the writer lock adding request taking a table as a unit, and forwards the writer lock adding request taking a certain part in the table as a unit. Specifically, a request about adding a writer lock to the part of the target table is sent to the second device 2.

Preferably, performing writer lock adding processing on the part of the target table includes: if the whole target table has been subjected to writer lock adding, omitting performing writer lock adding processing on the part of the target table; otherwise, performing writer lock adding processing on the part of the target table.

Here, if the whole target table has been subjected to writer lock adding by the first device 1, the transaction has acquired the writer lock of the whole target table currently, and it is unnecessary to acquire a writer lock of the part of the target table, so it is unnecessary to perform writer lock adding processing on the part of the target table at this moment.

In step S212", the second device 2 acquires the request, sent by the first device 1, about adding the writer lock to the part of the target table; and in step S213", the second device 2 performs writer lock adding processing on the part of the target table according to the request about adding the writer lock to the part of the target table.

Here, the second device 2 performs writer lock adding processing on the part of the target table according to the request, sent by the first device 1, about adding the writer lock to the part of the target table.

Preferably, the second device 2 includes a father node and a plurality of child nodes, where in step S213", the second device 2 distributes the request about adding the writer lock to the part of the target table to the plurality of child nodes through the father node, and performs writer lock adding processing on the part of the target table.

For example, the first device 2 may be a group formed by programs running on multiple physical machines; and in the group, one of the physical machines is selected as a father node, and the other physical machines are child nodes. When the request, sent by the first device 1, about adding the writer lock to the part of the target table is acquired, the father node is responsible for broadcasting the request about adding the writer lock to the part of the target table to all the child nodes in the group, so as to perform writer lock adding processing on the part of the target table.

Preferably, in step S213", the second device 2 queries the first device to judge whether the whole target table has been subjected to writer lock adding according to the request for adding the writer lock to the part of the target table; and if the whole target table has not been subjected to writer lock adding, the second device performs writer lock adding processing on the part of the target table.

For example, after acquiring the request about adding the writer lock to the part of the target table, the second device 2 may query to the first device 1 to judge whether the whole target table has been subjected to writer lock adding; and if the whole target table has been subjected to writer lock adding by the first device 1, the second device does not need to perform writer lock adding processing on the part of the target table.

Figure 5:
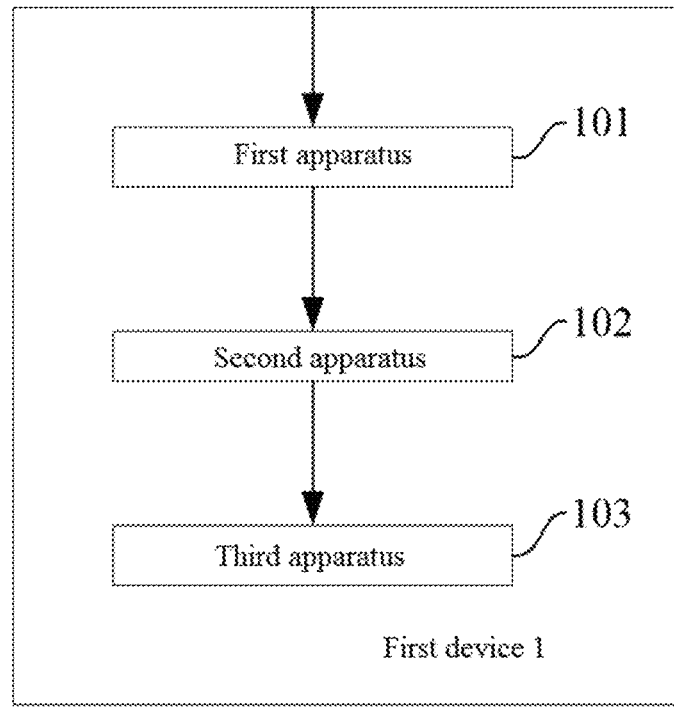
FIG. 5 shows a schematic diagram of a first device for processing a distributed transaction according to another aspect of the present application.

FIG. 5 shows a first device 1 for processing a distributed transaction according to another aspect of the present application. The first device 1 includes a first apparatus 101, a second apparatus 102 and a third apparatus 103.

Specifically, the first apparatus 101 acquires a writer lock adding request, sent by an SQL compiler, about a target table of a to-be-processed transaction, the transaction including a plurality of SQL sentences; the second apparatus 102 performs writer lock adding processing on the target table on the basis of the writer lock adding request; and the third apparatus 103 sends to-be-processed version information of the target table to the SQL compiler if the writer lock adding processing is successful.

Here, the first device 1 includes, but is not limited to, user equipment, a network device, or a device formed by integrating the user equipment and the network device through a network. The user equipment includes, but is not limited to, any one mobile electronic product capable of performing human-computer interaction with a user through a touch panel, such as a smart phone, a pad and the like, where the mobile electronic product may adopt any operating system, such as an android operating system, an iOS operating system and the like. Here, the network device includes an electronic device capable of automatically performing numerical calculation and information processing according to a preset or stored instruction, and hardware of the network device includes, but is not limited to, a microprocessor, an application specific integrated circuit (ASIC), a field programmable gate array (FPGA), a digital signal processor (DSP), an embedded device, etc. The network device includes, but is not limited to, a cloud formed by a computer, a network host, a single network server, multiple network server sets or multiple network servers; here, the cloud is formed by a great number of cloud computing-based computers or network servers, where cloud computing is one of distributed computing, and is executed by a virtual super computer formed by a group of loosely-coupled computer sets. The network includes, but is not limited to, an Internet, a wide area network, a metropolitan area network, a local area network, a VPN, an Ad Hoc network, etc. Preferably, the first device 1 may also be a script program running on the user equipment, the network device, or a device formed by integrating the user equipment and the network device, or by integrating the network device, or by integrating a touch terminal, or by integrating the network device and the touch terminal through a network. Certainly, a person skilled in the art shall understand that the above first device 1 is only exemplary, other existing or future possible first devices 1, which may be applied, for example, to the present application, shall be included within the scope of protection of the present application, and are included herein by reference.

The first apparatus 101 acquires a writer lock adding request, sent by an SQL compiler, about a target table of a to-be-processed transaction, the transaction including a plurality of SQL sentences.

Here, components of an SQL (structured query language) include a DCL (database control language). The transaction begins from a DCL sentence begin transaction, and ends by a DCL sentence commit or rollback. A plurality of CRUD (an acronym of vocabularies namely Create, Retrieve, Update and Delete, mainly used for describing basic operating functions of a database or a persistent layer in a software system) SQL sentences are included between the DCL sentences at start and end points of the transaction. The target table refers to a table on which the SQL sentences will execute a write operation. Moreover, in a locking process, a writer lock adding request corresponding to each SQL sentence in the transaction is carried out independently.

For example, the acquired SQL sentence is compiled by the SQL compiler first to obtain a table and an execution plan involved in the SQL sentence, and then the SQL compiler sends a writer lock adding request about a target table of the SQL sentence in the transaction to the first device 1, thereby avoiding collision problems in multi-transaction concurrence through a locking manner and ensuring isolation of transactions.

Preferably, the first apparatus 101 also acquires a reader lock adding request, sent by the SQL compiler, about a source table of the to-be-processed transaction.

Here, the source table refers to a table on which the SQL sentence will execute a read operation. In most of application scenarios, the SQL sentence has both a target table and a source table, and the SQL compiler also needs to send a reader lock adding request for the source table of the SQL sentence. In some of application scenarios, the SQL sentence only has a target table and has no source table, and the SQL compiler does not need to send a reader lock adding request for the source table of the SQL sentence.

The second apparatus 102 performs writer lock adding processing on the target table on the basis of the writer lock adding request.

Here, writer lock adding processing is performed on the target table of the SQL sentence of the transaction. Other transactions cannot execute the write operation on the target table which has been subjected to writer lock adding before the writer lock is released.

Preferably, the second apparatus 102 also performs reader lock adding processing on the source table on the basis of the reader lock adding request.

For example, if the SQL sentence has both the target table and the source table, it is also necessary to perform reader lock adding processing on the source table on the basis of the reader lock adding request.

Preferably, the first device 1 includes a father node and a plurality of child nodes, where the second apparatus 102 distributes the writer lock adding request to the plurality of child nodes through the father node, and performs writer lock adding processing on the target table.

For example, a physical machine (such as a server and the like) is a node. Referring to FIG. 1, the first device 1 may be a group formed by programs running on multiple physical machines; and in the group, one of the physical machines is selected as a father node, and the other physical machines are child nodes. When the writer lock adding request sent by the SQL compiler is acquired, the father node is responsible for broadcasting the writer lock adding request to all the child nodes in the group, so as to perform writer lock adding processing on the target table. In a preferable embodiment, under the scenario of large data volume and not high concurrency, the writer lock adding request is processed in batches.

The third apparatus 103 sends to-be-processed version information of the target table to the SQL compiler if the writer lock adding processing is successful.

For example, a result of each CRUD operation is a new version of a target table of the present CRUD operation. Usually one table will have multiple versions after being subjected to the CRUD operation. Here, after the writer lock adding processing is successful, the to-be-processed version information of the target table is returned to the SQL compiler, so as to ensure that the SQL compiler operates a correct version of the target table later.

Preferably, the third apparatus 103 sends to-be-processed version information of the source table to the SQL compiler if the reader lock adding processing is successful.

For example, if the SQL sentence has both the target table and the source table, it is also necessary to return the to-be-processed version information of the source table to the SQL compiler, so as to ensure that the SQL compiler operates a correct version of the target table later.

Preferably, the first device 1 further includes an eighth apparatus (not shown in the figure), the eighth apparatus combining a plurality of versions of the target table when the quantity of versions of the target table is equal to or greater than a predetermined version quantity threshold.

For example, after the target table is subjected to a plurality of CRUD operations, a plurality of versions will be generated accordingly. As time passes, the quantity of versions of the target table is continuously increasing. In a preferable embodiment, when the quantity of versions of the target table is equal to or greater than a predetermined version quantity threshold, the plurality of versions of the target table are combined to obtain a new version, and previous versions are cleared.

Preferably, the first device 1 further includes a ninth apparatus (not shown in the figure) or a tenth apparatus (not shown in the figure). The ninth apparatus sets the state of a new-version target table to be valid when a commit sentence is acquired, and unlocks the target table; and the tenth apparatus sets the state of the new-version target table to be invalid when a rollback sentence is acquired, and unlocks the target table.

For example, when a DCL sentence commit is acquired, all write operations of the transaction on the target table are marked to be valid, and meanwhile, all locks occupied by the transaction are released, namely the target table is unlocked; and when a DCL sentence rollback is acquired, all write operations of the transaction on the target table are marked to be invalid, and meanwhile, all locks occupied by the transaction are released, namely the target table is unlocked. Thus, the atomicity and consistency of the transaction are ensured.

Preferably, the first device 1 further includes an eleventh apparatus (not shown in the figure), the eleventh apparatus unlocking the source table when the commit sentence or the rollback sentence is acquired.

For example, when the commit sentence or the rollback sentence is acquired, all the locks occupied by the transaction will be released. Both a writer lock for the target table and a reader lock for the source table are released.

Figure 6:
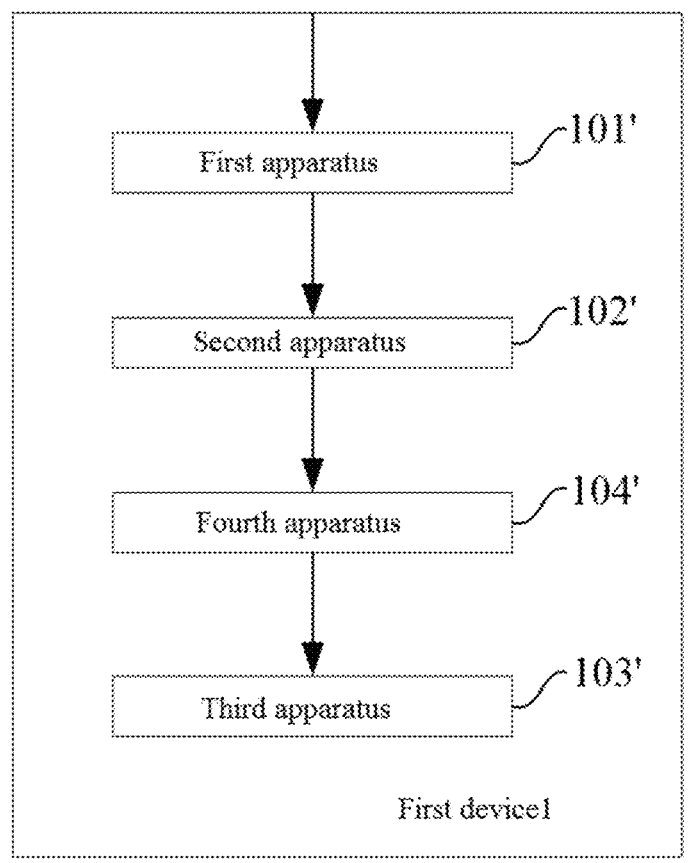
FIG. 6 shows a schematic diagram of a first device for processing a distributed transaction according to an embodiment of the present application.

FIG. 6 shows a first device 1 for processing a distributed transaction according to an embodiment of the present application. The first device 1 includes a first apparatus 101', a second apparatus 102', a fourth apparatus 104' and a third apparatus 103'.

Here, the contents of the first apparatus 101' and the third apparatus 103' are the same as or basically the same as those of the first apparatus 101 and the third apparatus 103 in FIG. 4. For brief descriptions, the contents will not be elaborated.

Specifically, the second apparatus 102' distributes the writer lock adding request to a plurality of child nodes through the father node, and performs writer lock adding processing on the target table on the basis of the writer lock adding request; and if the father node acquires responses of more than or equal to a predetermined number of the child nodes about the writer lock adding request within a predetermined time, the fourth apparatus 104' determines that the writer lock adding processing is successful.

For example, the father node is responsible for broadcasting the writer lock adding request to all the child nodes in a group and waiting for responses of the child nodes to the writer lock adding request. Only when responses of more than or equal to a predetermined number of the child nodes about the writer lock adding request are received, it is determined that the writer lock adding processing is successful. If the father node does not receive enough responses of the child nodes about the writer lock adding request within the predetermined time, locking is unsuccessful; at this moment, the father node may have two choices: 1, randomly waiting for a period of time and then continuously sending the writer lock adding request till a threshold of a locking attempt count is reached, and if locking is still unsuccessful at this moment, returning locking failure information; and 2, directly returning the locking failure information. After receiving the locking failure information, an SQL compiler needs to perform retry, namely to resend the writer lock adding request.

Preferably, determining that the writer lock adding processing is successful further includes: writing new locking state information into a log file; or storing the new locking state information by the father node.

For example, if the responses of more than or equal to a predetermined number of the child nodes about the writer lock adding request are obtained, it is determined that the writer lock adding processing is successful, and the new locking state information is stored. Here, there are two modes for storing the new locking state information: 1, writing the new locking state information into the log file; and 2, storing the new locking state information by the father node.

Further, the first device 1 further includes a fifth apparatus (not shown in the figure) and a sixth apparatus (not shown in the figure). The fifth apparatus restarts the child nodes which do not respond to the writer lock adding request, and the child nodes read newest locking state information from the log file; or the sixth apparatus restarts the child nodes which do not respond to the writer lock adding request, and the child nodes send the newest locking state information to the child nodes.

For example, according to the previous example, if the child nodes do not respond to the writer lock adding request (which may result from dead halt of a physical machine, etc.), it is necessary to restart the child nodes which do not respond to the writer lock adding request, and the child nodes need to update own state information after being restarted, in order to keep consistent with other members (including the father node and the child nodes) in the group. Here, the child nodes also have two modes for updating state information: 1, the child nodes read the newest locking state information from the log file; and 2, the father node sends the newest locking state information to the child nodes. In another embodiment, if the father node cannot respond, a new father node is reselected from the other child nodes in the group.

More preferably, restarting the child nodes which do not respond to the writer lock adding request further includes: if the child nodes which do not respond to the writer lock adding request cannot be restarted, migrating service of the child nodes to other physical machines through the father node, and starting the service of the child nodes on the physical machines.

For example, according to the previous example, the situation where the child nodes which do not respond to the writer lock adding request cannot be restarted may exist. At this moment, service of the child nodes may be migrated to other physical machines through the father node, and the service of the child nodes is started on the physical machines. Thereafter, all the child nodes on the physical machines may update own state information through the above two modes, in order to keep consistent with other members (including the father node and the child nodes) in the group. Compared with the prior art, by restarting child nodes which do not respond to the writer lock adding request or migrating service of the child nodes to other physical machines and then updating locking state information of the child nodes, the present invention effectively recovers errors and ensures in-group consistency.

Figure 7:
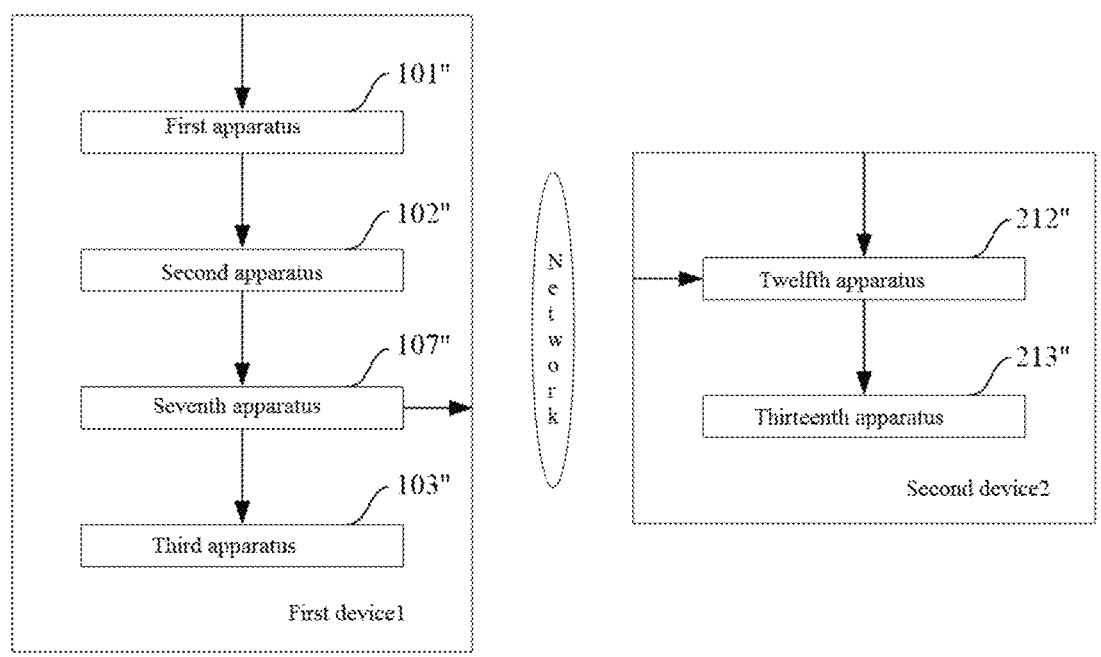
FIG. 7 shows a schematic diagram of a first device and a second device for processing a distributed transaction according to another embodiment of the present application.

FIG. 7 shows a first device 1 and a second device 2 for processing a distributed transaction according to another embodiment of the present application. The first device 1 includes a first apparatus 101", a second apparatus 102", a seventh apparatus 107" and a third apparatus 103". The second device 2 includes a twelfth apparatus 212" and a thirteenth apparatus 213".

Here, the contents of the first apparatus 101" and the third apparatus 103" are the same as or basically the same as those of the first apparatus 101 and the third apparatus 103 in FIG. 4. For brief descriptions, the contents will not be elaborated.

Specifically, the second apparatus 102" performs writer lock adding processing on a part of the target table on the basis of the writer lock adding request; and the seventh apparatus 107" sends to the second device a request about adding a writer lock to the part of the target table.

For example, under the scenario of small quantity and higher concurrency, the SQL compiler may further refine the granularity of a lock, and send a writer lock adding request to the first device 1 for a certain part in the target table. Here, the first device 1 responds to the writer lock adding request taking a table as a unit, and forwards the writer lock adding request taking a certain part in the table as a unit. Specifically, a request about adding a writer lock to the part of the target table is sent to the second device 2.

Preferably, performing writer lock adding processing on the part of the target table includes: if the whole target table has been subjected to writer lock adding, omitting performing writer lock adding processing on the part of the target table; otherwise, performing writer lock adding processing on the part of the target table.

Here, if the whole target table has been subjected to writer lock adding by the first device 1, the transaction has acquired the writer lock of the whole target table currently, and it is unnecessary to acquire a writer lock of the part of the target table, so it is unnecessary to perform writer lock adding processing on the part of the target table at this moment.

The twelfth apparatus 212" acquires a request, sent by the first device 1, about adding the writer lock to the part of the target table; and the thirteenth apparatus 213" performs writer lock adding processing on the part of the target table according to the request about adding the writer lock to the part of the target table.

Here, the second device 2 performs writer lock adding processing on the part of the target table according to the request, sent by the first device 1, about adding the writer lock to the part of the target table.

Preferably, the second device 2 includes a father node and a plurality of child nodes, where the thirteenth apparatus 213" distributes the request about adding the writer lock to the part of the target table to the plurality of child nodes through the father node, and performs writer lock adding processing on the part of the target table.

For example, the first device 2 may be a group formed by programs running on multiple physical machines; and in the group, one of the physical machines is selected as a father node, and the other physical machines are child nodes. When the request, sent by the first device 1, about adding the writer lock to the part of the target table is acquired, the father node is responsible for broadcasting the request about adding the writer lock to the part of the target table to all the child nodes in the group, so as to perform writer lock adding processing on the part of the target table.

Preferably, the thirteenth apparatus 213" queries to the first device to judge whether the whole target table has been subjected to writer lock adding according to the request about adding the writer lock to the part of the target table; and if the whole target table has not been subjected to writer lock adding, the apparatus performs writer lock adding processing on the part of the target table.

For example, after acquiring the request about adding the writer lock to the part of the target table, the second device 2 may query to the first device 1 to judge whether the whole target table has been subjected to writer lock adding; and if the whole target table has been subjected to writer lock adding by the first device 1, the second device does not need to perform writer lock adding processing on the part of the target table.

Preferably, the present application also provides a system for processing a distributed transaction. The system includes the above-mentioned first device 1 and the above-mentioned second device 2.

For example, under the scenario of small quantity and higher concurrency, the system formed by the first device 1 and the second device 2 performs writer lock adding processing on a target table of the transaction, where the first device 1 responds to a writer lock adding request taking a table as a unit, and forwards a writer lock adding request, taking a certain part in the table as a unit, to the second device 2, and the second device 2 performs writer lock adding processing on a part of the target table.

Compared with the prior art, in a distributed system, a first device in the present application is a group formed by multiple nodes. The first device acquires a writer lock adding request, sent by an SQL compiler, about a target table of a to-be-processed transaction, and performs writer lock adding processing on the target table on the basis of the writer lock adding request, so as to avoid collision problems in multi-transaction concurrence and to ensure isolation of transactions. If the writer lock adding processing is successful, to-be-processed version information of the target table is sent to the SQL compiler, so as to ensure that the SQL compiler operates a correct version of the target table later. Further, by restarting child nodes which do not respond to the writer lock adding request or migrating service of the child nodes to other physical machines and then updating locking state information of the child nodes, the present application effectively recovers errors and ensures in-group consistency. Further, under the scenario of small quantity and higher concurrence, by performing writer lock adding processing on the target table of the transaction through the system formed by the first device and the second device and performing writer lock adding processing on a part of the target table through the second device, the present application improves the efficiency of the system.

It should be noted that the present application may be implemented in software and/or a combination of software and hardware, or may be implemented, for example, by using an application specific integrated circuit (ASIC), a general purpose computer or any other similar hardware devices. In an embodiment, a software program of the present application may be executed by a processor to achieve the steps or functions mentioned above. Likewise, the software program of the present application (including a relevant data structure) may be stored in a computer-readable recording medium, such as an RAM, a magnetic driver or an optical driver or a floppy disk and similar devices. In addition, some steps or functions of the present application may be implemented by using hardware, such as a circuit matched with a processor so as to execute each step or function.

In addition, a part of the present application may be applied to a computer program product, such as a computer program instruction. When being executed by a computer, the computer program instruction may call or provide a method and/or a technical solution according to the present application through the operations of the computer. The program instruction calling the method of the present application may be stored in a fixed or mobile recording medium, and/or is transmitted through broadcasts or data streams in other signal bearer media, and/or is stored in a working memory of a computer device running according to the program instruction. Here, according to an embodiment of the present application, an apparatus is included. The apparatus includes a memory for storing a computer program instruction and a processor for executing the program instruction, where when the computer program instruction is executed by the processor, the apparatus is triggered to run on the basis of the method and/or technical solution according to multiple embodiments of the present application.

Obviously, the present application is not limited to details of the above-mentioned exemplary embodiments, and a person skilled in the art can implement the present application in other specific forms without departing from the spirit or essential features of the present application. Therefore, from any perspective, the embodiments shall be regarded to be exemplary and non-restrictive, and the scope of the present application is limited by the appended claims rather than the above-mentioned illustrations, thus being intended to include all changes falling within the implication and scope of equivalent elements of the claims in the present application. Any drawing marks in the claims shall not be regarded as limiting the involved claims. In addition, apparently, a term 'including' does not exclude other units or steps, and a singular form does not exclude a plural form. Multiple units or apparatuses described in the apparatus claims may also be implemented by a unit or apparatus through software or hardware. Terms including first, second and the like are used for representing names instead of any specific order.

What is claimed is:

1. A method for processing a distributed transaction in a database at a first device, the method comprising:
    a, acquiring a writer lock adding request, sent by an SQL compiler, about a target table of a to-be-processed transaction, the transaction comprising a plurality of SQL sentences;
    b, performing writer lock adding processing on the target table on the basis of the writer lock adding request; and
    c, sending to-be-processed version information of the target table to the SQL compiler in response to the writer lock adding processing being successful,
    wherein the first device comprises a father node and a plurality of child nodes, the first device is a group of physical machines, each of the father node and the plurality of child nodes is a physical machine having a processor and a memory,
    the step b comprising:
    distributing the writer lock adding request to the plurality of child nodes through the father node, and performing writer lock adding processing on the target table,
    the method further comprising:
        determining a quantity of versions of the target table after a plurality of operations on the target table;
        combining a plurality of versions of the target table after the quantity of versions of the target table is determined to be equal to or greater than a predetermined version quantity threshold.

2. The method according to claim 1, further comprising: in response to the father node acquiring responses of more than or equal to a predetermined number of the child nodes about the writer lock adding request within a predetermined time, determining that the writer lock adding processing is successful.

3. The method according to claim 2, wherein determining that the writer lock adding processing is successful further comprises:
    writing new locking state information into a log file; or
    storing the new locking state information by the father node.

4. The method according to claim 3, also comprising:
    restarting the child nodes which do not respond to the writer lock adding request, and reading newest locking state information from the log file by the child nodes; or
    restarting the child nodes which do not respond to the writer lock adding request, and sending the newest locking state information to the child nodes by the father node.

5. The method according to claim 4, wherein restarting the child nodes which do not respond to the writer lock adding request further comprises:
    in response to the child nodes which do not respond to the writer lock adding request not being able to be restarted, migrating service of the child nodes to other physical machines through the father node, and starting the service of the child nodes on the physical machines.

6. The method according to claim 1, wherein the step b comprises:
    performing writer lock adding processing on a part of the target table,
    the method further comprising:
    sending to a second device a request about adding a writer lock to the part of the target table.

7. The method according to claim 6, wherein performing writer lock adding processing on the part of the target table comprises:
    in response to the whole target table having been subjected to writer lock adding, omitting performing writer lock adding processing on the part of the target table; otherwise, performing writer lock adding processing on the part of the target table.

8. The method according to claim 1, further comprising:
    when a commit sentence is acquired, setting the state of a new-version target table to be valid, and unlocking the target table; or
    when a rollback sentence is acquired, setting the state of the new-version target table to be invalid, and unlocking the target table.

9. The method according to claim 1, wherein the step a further comprises:
    acquiring a reader lock adding request, sent by the SQL compiler, about a source table of the to-be-processed transaction;
    the step b further comprises:
    performing reader lock adding processing on the source table on the basis of the reader lock adding request;
    the step c further comprises:
    sending to-be-processed version information of the source table to the SQL compiler in response to the reader lock adding processing being successful; and
    the method further comprising:
    when the commit sentence or the rollback sentence is acquired, unlocking the source table.

10. The method according to claim 1, further comprising:
    after combining the plurality of versions of the target table, obtaining a new version of the target table and clearing the plurality of versions of the target table.

11. A first device for processing a distributed transaction in a database, the device comprising:
- a first apparatus, used for acquiring a writer lock adding request, sent by an SQL compiler, about a target table of a to-be-processed transaction, the transaction comprising a plurality of SQL sentences;
- a second apparatus, used for performing writer lock adding processing on the target table on the basis of the writer lock adding request; and
- a third apparatus, used for sending to-be-processed version information of the target table to the SQL compiler in response to the writer lock adding processing being successful,
- wherein the device comprises a father node and a plurality of child nodes, the device is a group of physical machines, each of the father node and the plurality of child nodes is a physical machine having a processor and a memory,
- the second apparatus being used for:
- distributing the writer lock adding request to the plurality of child nodes through the father node, and performing writer lock adding processing on the target table,
- the device is configured to determine a quantity of versions of the target table after a plurality of operations on the target table,
- the device further comprising:
- an eighth apparatus, used for combining a plurality of versions of the target table after the quantity of versions of the target table is determined to be equal to or greater than a predetermined version quantity threshold,
- wherein each of the first apparatus, the second apparatus, the third apparatus, and the eight apparatus is a physical machine having a processor and a memory.

12. The device according to claim 11, further comprising:
- a fourth apparatus, used for determining that the writer lock adding processing is successful in response to the father node acquiring responses of more than or equal to a predetermined number of the child nodes about the writer lock adding request within a predetermined time.

13. The device according to claim 12, wherein determining that the writer lock adding processing is successful further comprises:
- writing new locking state information into a log file; or
- storing the new locking state information by the father node.

14. The device according to claim 13, further comprising:
- a fifth apparatus, used for restarting the child nodes which do not respond to the writer lock adding request, and reading newest locking state information from the log file by the child nodes; or
- a sixth apparatus, used for restarting the child nodes which do not respond to the writer lock adding request, and sending the newest locking state information to the child nodes by the father node.

15. The device according to claim 14, wherein restarting the child nodes which do not respond to the writer lock adding request further comprises:
- in response to the child nodes which do not respond to the writer lock adding request not being able to be restarted, migrating service of the child nodes to other physical machines through the father node, and starting the service of the child nodes on the physical machines.

16. The device according to claim 11, wherein the second apparatus is used for:
- performing writer lock adding processing on a part of the target table,
- the device further comprising:
- a seventh apparatus, used for sending to a second device a request about adding a writer lock to the part of the target table.

17. The device according to claim 16, wherein performing writer lock adding processing on the part of the target table comprises:
- in response to the whole target table having been subjected to writer lock adding, omitting performing writer lock adding processing on the part of the target table; otherwise, performing writer lock adding processing on the part of the target table.

18. The device according to claim 11, further comprising:
- a ninth apparatus, used for setting the state of a new-version target table to be valid, and unlocking the target table when a commit sentence is acquired; or
- a tenth apparatus, used for setting the state of the new-version target table to be invalid, and unlocking the target table when a rollback sentence is acquired.

19. The device according to claim 11, wherein the first apparatus is further used for:
- acquiring a reader lock adding request, sent by the SQL compiler, about a source table of the to-be-processed transaction;
- the second apparatus is further used for:
- performing reader lock adding processing on the source table on the basis of the reader lock adding request;
- the third apparatus is further used for:
- sending to-be-processed version information of the source table to the SQL compiler in response to the reader lock adding processing being successful; and
- the device further comprising:
- an eleventh apparatus, used for unlocking the source table when the commit sentence or the rollback sentence is acquired.

20. The device according to claim 11, wherein the device is configured to obtain a new version of the target table and clear the plurality of versions of the target table after the eighth apparatus combines the plurality of versions of the target table.

* * * * *